United States Patent [19]

Lacoste et al.

[11] 4,415,758
[45] Nov. 15, 1983

[54] PROCESS FOR MAKING A JOINT BETWEEN TWO METAL WIRES AND A DIFFERENTIAL THERMOCOUPLE

[75] Inventors: Jean-André Lacoste, Paris; Jean-Pierre Leveque, Gif-sur-Yvette; Robert Schley, Orly, all of France

[73] Assignee: Commissariat a l'Energie Atomique, Paris, France

[21] Appl. No.: 203,948

[22] Filed: Nov. 4, 1980

[30] Foreign Application Priority Data

Nov. 7, 1979 [FR] France .................... 79 27454

[51] Int. Cl.³ .................................. H01L 35/02
[52] U.S. Cl. .................................. 136/233; 136/232; 136/236 R; 136/239; 228/173 E; 228/194; 376/247
[58] Field of Search .................. 136/232, 233, 236 R, 136/239, 249, 241, 242; 228/173 A, 173 E, 193, 194, 212; 376/247

[56] References Cited

U.S. PATENT DOCUMENTS

| | | | |
|---|---|---|---|
| 3,049,577 | 8/1962 | Hill | 136/236 |
| 3,065,286 | 11/1962 | Connell | 136/233 |
| 3,314,129 | 4/1967 | Pugh et al. | 136/233 |
| 3,451,859 | 7/1969 | Zysk et al. | 136/236 |
| 3,457,122 | 7/1969 | Sibley et al. | 136/239 |
| 3,673,003 | 6/1972 | Starr et al. | 136/236 |
| 4,121,749 | 10/1978 | Cure | 136/233 |

FOREIGN PATENT DOCUMENTS 1131145 10/1968 United Kingdom ............ 136/242

OTHER PUBLICATIONS

The Condensed Chemical Dictionary, Van Nostrand Reinhold Co., New York, 1977, p. 816.

Primary Examiner—Leland A. Sebastian
Attorney, Agent, or Firm—Pearne, Gordon, Sessions, McCoy, Granger & Tilberry

[57] ABSTRACT

Process for producing a joint between two metal wires for use in the construction of thermocouples or neutron flux probes or sensors having a small external diameter is disclosed.

A stack is formed from two wires placed end to end and having an interface. This stack is placed in a tube which is sealed at both ends. The tube is made from a material, whose thermal expansion coefficient is well below that of the two wires. Spacers or shims are placed between the free ends of both wires. The assembly is exposed to a temperature such that the two contacting ends of the wires are welded under the action of the difference in the elongations of the tube and the wires.

8 Claims, 3 Drawing Figures

PROCESS FOR MAKING A JOINT BETWEEN TWO METAL WIRES AND A DIFFERENTIAL THERMOCOUPLE

BACKGROUND OF THE INVENTION

The present invention relates to a process for making a joint between two metal wires of very small size and measuring devices obtained on the basis of this joint.

More specifically, the present invention relates to means for obtaining a joint between a wire made from a first metal and a wire made from a second metal corresponding to a very small junction length between the two wires, for example less than 10 microns.

It is known that in nuclear reactors, it is necessary to measure the thermal neutron flux distribution along the vertical axis of the reactor core. This applies inter alia to pressurized water reactors. The method consists of analysing the distribution of the flux using devices which are conventionally called gamma thermometers. In actual fact, the gamma heating produced by the neutron flux is measured. This analysis is carried out on the basis of the evaluation of the thermal conductivity in a stainless steel bar by means of differential thermocouples distributed along said bar, which substantially occupies the entire height of the reactor core. It is necessary for these bars to have a reduced diameter and consequently it is a fortioti necessary for the differential thermocouples to also have a very small diameter. More specifically, it is very desirable for the external diameter of the thermocouple, including its electrical insulating members to be approximately 1 to 0.5 mm. It is also known that in these reactors, it is important to carry out neutron flux measurements. A known neutron flux measuring device consists of an active platinum wire which behaves like a $\beta$ collector. This platinum wire is connected on the one hand by a weld to a conductive wire, e.g. of stainless steel, and on the other to the conductive sheath. In this case, it is also important to have a connection of minimum length between the platinum wire and the stainless steel wire. In fact, there is a mixture of platinum and stainless steel in the connecting zone. The presence of the platinum-alloyed stainless steel substantially modifies the $\beta$ collection properties of this second member. Thus, there is also a disturbance to the neutron flux measurement.

The attached FIG. 1 diagrammatically shows a differential thermocouple. This thermocouple generally comprises two welds $S_1$ and $S_2$ between a conductive wire $F_1$ made from alumel and two conductive wires $F_2$ and $F'_2$ made from chromel. If the two welds $S_1$ and $S_2$ are placed in media corresponding to different temperatures $\theta_1$ and $\theta_2$, electromotive forces are produced at the said two welds. These are called $e_1$ and $e_2$. As a result of this differential thermocouple, it is possible to measure at the terminals A and B of the device the electromotive force $e = e_1 - e_2$ which therefore corresponds to the temperature difference $\theta_1 - \theta_2$ associated with the two welds $S_1$ and $S_2$.

Although the principle of differential thermocouples is well known, whilst their construction is also generally known, it is much more difficult to produce differential thermocouples, whose diameter is compatible with the requirements necessary for placing said thermocouples in a stainless steel bar for heating measurements due to the gamma radiation in a nuclear reactor core.

Thus, to obtain a precise measurement of the gamma heating, it is absolutely necessary for the weld between the chromel wire and the alumel wire or the welds between said two wires to have only a very limited length in order to ensure a very good localization of the measurement performed by this device.

A known method for obtaining differential thermocouples with an external diameter of the order of magnitude indicated hereinbefore (0.5 to 1 mm) consists of starting with a blank of the type shown in FIG. 2. This blank comprises a chromel wire 2 and a chromel wire portion 3 welded to one end of an alumel wire portion 4 by a weld 5. These two wire systems have a diameter of approximately 1.5 mm. The system of two wires is embedded in a ceramic insulating material formed, for example, by alumina or pulverulent magnesia, the insulant carrying the reference numeral 6. The external stainless steel sheath 8 surrounds the ceramic insulant. This blank has an external diameter of approximately 13 mm. The blank is subject to a drawing operation, which makes it possible to reduce the initial external diameter of 13 mm to a final diameter of 1 or 0.5 mm. The problem involved in this operation is that due to the drawing, even if the weld 5 is produced with maximum precision by known means, it is very significantly elongated.

Thus, in the case of wires having an initial diameter of 1.5 mm on starting with a 0.5 mm long weld of the initial blank (which already corresponds to a weld with a completely satisfactory quality) a very significant elongation of the weld is obtained during drawing in order to obtain the desired final size.

More specifically, if it is desired to obtain a thermocouple having an external diameter of 0.5 mm in its final state weld 5 has a length of 140 mm. On making do with an external diameter of 1 mm, the weld length is still 35 mm. However, such weld lengths are incompatible with a precise measurement of the gamma heating, due to the imprecision of the localization of the weld ensuring the measurement.

BRIEF SUMMARY OF THE INVENTION

The present invention relates to a method for making a weld between a first metal wire and a second metal wire making it possible to obtain a pre-drawing weld length such that, following this operation, the weld length is very small and for example less than 2 mm. It is obvious that in the case of such a weld, between, for example, an alumel wire and a chromel wire, it is still easy to produce a differential thermocouple having a reduced diameter, or in the case of platinum and stainless steel a neutron flux sensor.

The method consists of making a stack by placing the first metal wire and the second metal wire end to end and fixing said stack in a tube made, for example, of molybdenum and sealed at its two ends by a plug made from the same material as the tube. In addition, an alumina tube and alumina spacers insulate the chromel-alumel stack from the tube and the plugs. More generally, the tube is made from a material having a thermal expansion coefficient which is much lower than that of the two metal wires. The assembly is heated to a temperature of approximately 1100° C. for a time between 30 and 60 minutes. Due to the difference in the thermal expansion coefficients of chromel and alumel, compared with that of the material forming the tube, for example molybdenum, the members made with the two metals are exposed to a high pressure during heating, so that by diffusion a weld is formed between the contacting ends of the members.

The invention also relates to the use of such a joint for forming a device for measuring a very small external diameter, for example below 1 mm or approximately 1 mm. Preferably, this device is a differential thermocouple or a neutron flux probe.

In the case of thermocouples, the two wires can be chromel and alumel, Nicrosil and Nisil (Nicrosil: Ni 14.2%, Cr 1.4%, Si and Nisil: Ni 4.4%, Si 0.1% Mg), platinum and platinum alloyed with rhodium. In the case of the neutron flux probe, preferably platinum is used as the active material and stainless steel as the electrical conductor.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

With reference to the attached FIG. 3, a description will now be given of the different stages of the process according to the invention applied to obtaining a joint of very reduced length between an alumel (94% nickel, 2.5% manganese, 2% aluminum, 1% silicon, and 0.5% iron) wire and a chromel 64–89% nickel, 0–25% iron, and 10–20% chromium wire.

Figure 3:
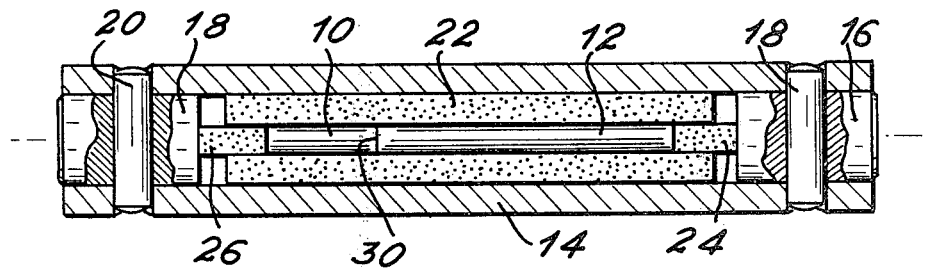
FIG. 3 an arrangement for producing an alumel-chromel weld according to the invention making it possible to obtain a very small joint length between said two materials.

As can be seen in FIG. 3, firstly a stack is formed from an alumel wire 10 and a chromel wire 12, the said wires being placed end to end. This stack is placed inside an enclosure constituted by a molybdenum external tube 14. This enclosure is completed by two plugs 16 and 18, also made from molybdenum and which are fixed to the tube by pins 18 and 20, also made from molybdenum. Tube 14 has an internal bore adequate to permit the placing between the stack of wires 10, 12 and the tube itself an internal alumina sleeve 22. Moreover, the distance separating plugs 16 and 18 is sufficient to make it possible to place between the respective ends of wires 10 and 12 cylinders 24 and 26, which form spacers and which are also made from alumina. These cylinders 24 and 26 are respectively supported on plugs 18 and 16 and on the ends of wires 10 and 12.

In a second stage, the thus formed assembly is heated to a temperature of approximately 1100° C. for a period between 30 and 60 minutes. Under the action of this heating, a joint is obtained by diffusion between the alumel wire 10 and the chromel wire 12 at their contacting interface 30. This result is obtained by the following process. The alumel and chromel on the one hand and the molybdenum on the other have very different thermal expansion coefficients, and in actual fact, the thermal expansion coefficient of chromel and alumel is 2 to 3 times higher than that of molybdenum. During the heating at the indicated temperature and due to the fact that wires 10 and 12 are blocked by plugs 24 and 26, a considerable pressure is developed level with interface 30 ensuring welding by diffusion between said materials.

The thickness of the thus obtained weld is approximately 1 micron. Even if it is accepted that this weld has a length of approximately 5 microns the following weld lengths will be obtained after converting the blanks by drawing in order to reduce the external diameter to the dimensions indicated hereinbefore. In the case of a complete differential thermocouple with an external diameter of 1 mm, the weld length is 0.35 mm. To obtain a differential thermocouple, whose external diameter is 0.5 mm, the weld length is 1.4 mm.

It is apparent from the points made hereinbefore that the weld length between the chromel and alumel obtained by performing the process of the invention has no common ground with the weld lengths obtained by the known processes. More specifically, it can be pointed out that there is a factor of 100 between the weld length obtained by the known processes and the weld length obtained by the process of the invention.

Figure 1:
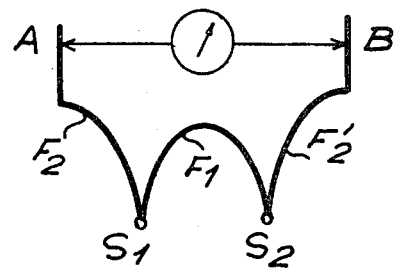
FIG. 1, already described, a simplified diagram of a differential thermocouple usable for measuring the neutron flux.
Figure 2:
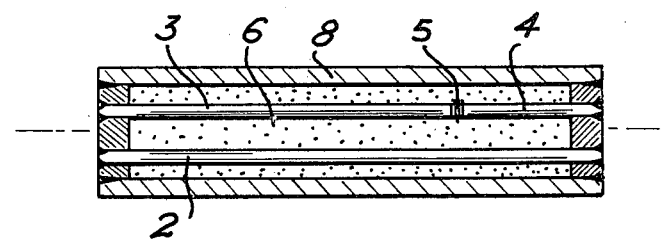
FIG. 2, already described, a blank for producing a differential thermocouple having a reduced external diameter and produced in accordance with the prior art.

On obtaining the chromel-alumel weld with the length indicated hereinbefore, no particular difficulty is encountered in placing the two welds in a device like that shown in FIG. 2 before carrying out the drawing operation to obtain the differential thermocouple.

It is apparent that as a result of the very reduced length of the joints between the conductive materials of different types a differential thermocouple is obtained making it possible to obtain very precise measurements of the gamma heating in the nuclear reactor core.

The same operating stages are performed to obtain a platinum-rhodium-alloyed platinum thermocouple or a Nicrosil-Nisil thermocouple. Once again, molybdenum would be used for forming enclosure 14 and temperatures of the same order of magnitude would be used.

For producing the neutron flux probe, the platinum-stainless steel joint is produced by the same process. To obtain the complete probe, the only difference is that there is only a single weld.

We claim:

1. A process for producing a joint between a first metal wire and a second metal wire, the joint having a length less than 10 microns, comprising the steps of forming a stack from a first metal wire and a second metal wire placed end to end and having an interface, placing the stack in a tube sealed at its two ends and made from a material whose thermal expansion coefficient is well below that of the metals forming the two wires, placing spacers made from a ceramic material between the tube and the stack in such a way that the free end of each wire is immobilised with respect to one of the ends of the tube and heating this assembly at a temperature less than the melting temperatures of the metals of which said first and second wires are made so that a diffusion weld is obtained at the contacting ends of the wires under substantially high pressure caused by the action of the difference in the elongations of the tube and the wires.

2. A process according to claim 1, wherein the tube is made from polybdenum and the temperature is approximately 1100° C.

3. A process according to claim 2, wherein the temperature is applied for between 30 and 60 minutes.

4. A process according to claim 1, wherein the first wire is made from an alloy comprised of 94% nickel, 2.5% manganese, 2% aluminum, 1% silicon, and 0.5% iron and the second wire is made from an alloy comprised of 64–89% nickel, 0–25% iron, and 10–20% chromium.

5. A process according to claim 1, wherein the first wire is made from platinum and the second wire is made from platinum alloyed with rhodium.

6. A process according to claim 1, wherein the first wire is made from an alloy comprised of 14.2% nickel, 1.4% chromium, and 84.4% silicon and the second wire from an alloy comprised of 4.4% nickel, 0.1% magnesium, and 95.5% silicon.

7. A process according to claim 1, wherein the first wire is made from platinum and the second wire is made from stainless steel.

8. A process for producing a differential thermocouple, wherein a weld is produced by diffusion between one end of a first wire made from an alloy comprised of 64–89% nickel, 0–25% iron, and 10–20% chromium, and one end of a second wire from an alloy comprised of 94% nickel, 2.5% manganese, 2% aluminum, 1% silicon, and 0.5% iron, comprising the steps of formulating an assembly by embedding the wire, provided with the weld, and another wire made from either of said alloys in an insulating ceramic material surrounded by a sheath and subjecting said assembly to a drawing operation to give said assembly a suitable final external diameter for use as a differential thermocouple, said process including the steps of producing said diffusion weld comprising forming a stack from said first and second metal wires placed end to end and having an interface, placing the stack in a tube sealed at its two ends and made from a material whose thermal expansion coefficient is well below that of the metals forming the first and second wires, placing spacers made from a ceramic material between the tube and the stack in such a way that the free end of each wire is immobilised with respect to one of the ends of the tube and heating the assembly at a temperature less than the melting temperatures of the metals of which said first and second wires are made, so that a diffusion weld is obtained at the contacting ends of the first and second wires under substantially high pressure caused by the action of the difference in elongations of the tube and the first and second wires.

* * * * *

UNITED STATES PATENT AND TRADEMARK OFFICE
CERTIFICATE OF CORRECTION

PATENT NO. : 4,415,758
DATED : November 15, 1983
INVENTOR(S) : Jean-Andre Lacoste, Jean-Pierre Leveque, Robert Schley It is certified that error appears in the above-identified patent and that said Letters Patent are hereby corrected as shown below:

CLAIMS

Column 4, line 61, "polybdenum" should read --molybdenum--

Column 5, line 18, "made" should be inserted after "wire".

Signed and Sealed this

Thirteenth Day of March 1984

[SEAL]

Attest:

GERALD J. MOSSINGHOFF

Attesting Officer

Commissioner of Patents and Trademarks